March 6, 1962

K. R. WALCH 3,024,301

WIRING GRILLE

Filed Oct. 5, 1955

Inventor:
Kurt R. Walch,
by J Wesley Haubner
His Attorney.

United States Patent Office 3,024,301

Patented Mar. 6, 1962

3,024,301

WIRING GRILLE

Kurt R. Walch, Philadelphia, Pa., assignor to General Electric Company, a corporation of New York Filed Oct. 5, 1955, Ser. No. 538,626

5 Claims. (Cl. 174—72)

This invention relates to wiring grilles of the type used in wired equipment for supporting a bundle of wires and for routing the individual wires of the bundle to and from the various devices which are to be wired.

In the past it has been customary to form these grilles of sheet metal with holes punched in the sheet metal for receiving the various individual wires which are taken from the bundle. A necessary step in a wiring operation performed with this sheet-metal type of grille has been to thread the wires through the holes of the grille. This has proven to be a tedious process consuming an undue amount of time. Another disadvantage of the sheet-metal construction is that the holes must be spaced rather widely in order to maintain adequate mechanical strength for the grille. The result is that the surface area of the grille is not efficiently utilized for the reception of wires.

Accordingly, it is an object of my invention to provide a new and improved wiring grille which is so constructed that wires may be routed through openings in the grille without the necessity of threading the wires through the openings.

Another object is to provide a grille wherein the wires can be quickly slipped from the outer edge of the grille into a wire-receiving opening and be resiliently retained in the opening without the danger of accidental displacement during the wiring operation.

Another object is to construct the grille in such a manner that the maximum area of the grille is available for reception of wires.

In accordance with a preferred form of my invention, the wiring grille comprises a longitudinally-extending base along which a bundle, or group, of circuit wires is adapted to extend. Alongside the base and projecting therefrom in generally perpendicular relationship is a grillwork comprising longitudinally-spaced arms formed of wire. Each arm comprises a pair of closely-adjacent, substantially parallel segments and an enlarged loop portion interconnecting said segments at their outer ends. The segments of adjacent arms define therebetween a space for receiving circuit wires from the bundle which, during the wiring operation, are slipped between adjacent loop portions.

In accordance with the preferred form of my invention, the loop portions of adjacent arms are located in substantially the same plane with the distance between said loop portions being less than the diameter of the circuit wires in the bundle. The segments are resilient to permit the circuit wires to be forced between said loop portions and resiliently retained in the space between the segments of adjacent arms.

Figure 1:
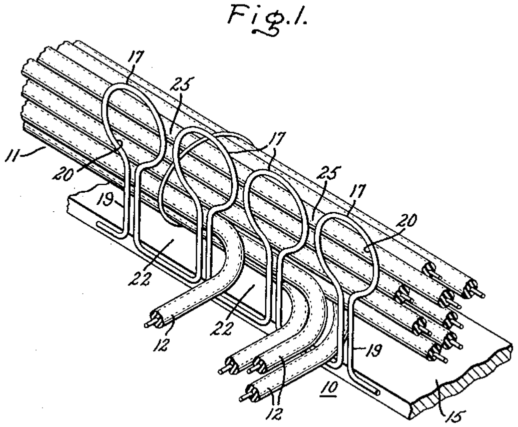
Figure 2:
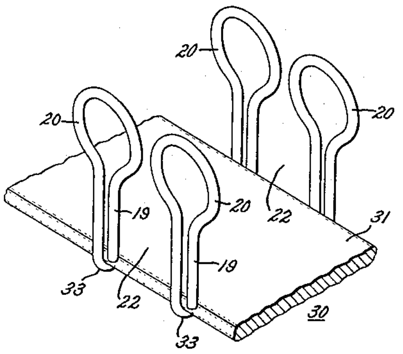
Figure 3:
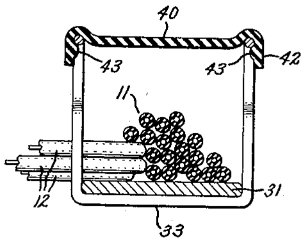
Figure 4:
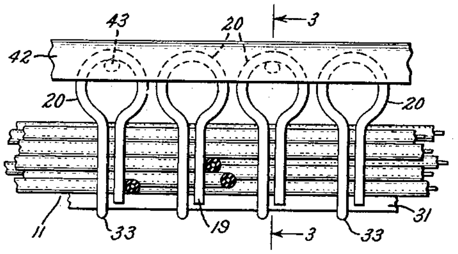
Figure 5:
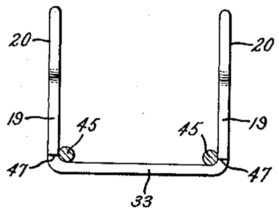
Figure 6:
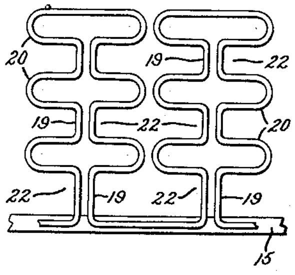
Figure 7:
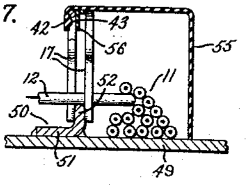

For a better understanding of my invention, reference may be had to the following specification taken in connection with the accompanying drawing, wherein: FIG. 1 is a perspective view of one form of wiring grille constructed in accordance with my invention. FIG. 2 is a perspective view of a modified form of wiring grille, i.e., a wiring grille of the trough type. FIG. 3 is a sectional view taken in a plane transverse to the length of the trough shown in FIG. 2 and showing a cap covering the open side of the trough. FIG. 4 is a side elevational view of the trough shown in FIGS. 2 and 3. FIG. 5 is a sectional view through a modified form of wiring trough. FIG. 6 shows another modified form of wiring grille. FIG. 7 is a sectional view through still another modified form of wiring grille.

Referring now to FIG. 1, there is shown a wiring grille 10 which is adapted to support a bundle, or group, 11 of circuit wires 12 and to route the individual circuit wires to and from the various devices (not shown) which are to be wired. This wiring grille 10 comprises a longitudinally-extending supporting base 15 along which the bundle of wires extends. This base 15 is appropriately secured to the panel on or adjacent which the various devices are mounted. Alongside the base and projecting therefrom in generally perpendicular relationship is a grillwork comprising longitudinally-spaced arms 17. These arms 17 are formed from a wire which is fastened, as by welding, to the edge of the base 15. Each of the arms 17 comprises a pair of closely-adjacent, substantially parallel segments 19 and an enlarged loop portion 20 interconnecting the segments at their outer ends. The segments of each pair of adjacent arms define therebetween a space 22 for receiving wires leading to and from the bundle 11.

In accordance with my invention, the arms 17 are so located that the distance between adjacent loop portions 20 is less than the diameter of the circuit wires in the bundle. As a result, the circuit wires are effectively retained in the space 22 and prevented from being accidentally displaced therefrom during the wiring operation. The segments 19 have a moderate degree of resilience so that wires leading off from the bundle can be slipped between the loop portions 20 and into the space 22 if sufficient force is applied to the wire to displace the loops, or if the loops are otherwise displaced. Permitting the wires to enter the space 22 in this manner is especially advantageous in that it obviates the need for threading wires through the opening, which, as previously stated, is a tedious, time-consuming process. Threading is also disadvantageous because it tends to abrade the insulation of the circuit wires.

Because the segments 19 of each arm 17 are positioned in closely-adjacent, substantially parallel relationship and because the adjacent segments of adjacent arms are substantially parallel, the spaces 22 defined between the arms have a cross sectional area approaching the maximum possible value. Thus, the described grille is capable of receiving an exceptionally large number of circuit wires per unit of area, and these wires can be quickly and easily slipped into their desired position without the need for a threading operation.

The wire of which the grillwork is constructed has, in cross-section, a round, or otherwise curved, peripheral configuration so that only curved surfaces are presented for contact with the circuit wires. This eliminates the danger that the insulation of the circuit wires will be damaged by any sharp edges.

Although I have shown the adjacent loop portions 20 spaced-apart at 25, it is to be understood that these loop portions can be positioned to actually contact each other without departing from my invention.

My invention is also applicable to the trough type of wiring grille, such as shown at 30 in FIG. 2. This type of grille, which is commonly termed a wiring trough, is of a channel-shaped configuration and is adapted to carry between its spaced sidewalls a bundle of circuit wires, individual ones of which can be directed through the sidewalls into connected relationship with the various devices which are to be wired. As shown in FIG. 2, the wiring trough 30 comprises a sheet metal base 31 extending longitudinally of the trough and a plurality of U-shaped wires 33 secured to the lower side of the base in spaced-apart relationship along the length of the trough. The U-shaped wires comprise arms 19, 20 defining sidewalls for the trough, and each of these arms is of essentially the same shape and construction as the arms shown in FIG. 1. That is, each arm comprises a pair of closely-adjacent, substantially-parallel segments 19 and an enlarged loop portion 20 interconnecting the segments at their upper ends. The segments 19 are moderately resilient and the loops of adjacent arms are spaced apart by an amount less than the diameter of the circuit wires, all as described with respect to FIG. 1. Similarly, circuit wires can be forced between the loops into spaces 22 in the same manner as described in connection with FIG. 1.

As seen in FIG. 2, each of those segments 19 which is located at the end of a wire 33 is extended down to a point below the upper surface of the base 31. This desirably locates the sharp edge at the end of the segment in such a position as to minimize the likelihood that it will come into contact with the insulation of a circuit wire, thus minimizing the danger of resultant damage to such insulation. Utilizing U-shaped wires, such as 33, facilitates fabrication of the grille and provides relatively long contact surfaces between the base and the wires along which a strong weld can be applied. However, where these considerations are of no particular importance, each of the arms 19, 20 can be formed as a separate member individually secured to the edge of the base 31.

The trough of FIG. 2 readily lends itself to being covered by a simple snap on type of cover which is so constructed that its edges are shielded from contact with the circuit wires extending through the openings 22. This cover is illustrated in FIGS. 3 and 4, wherein it is shown as comprising a body portion 40 bridging the sidewalls of the trough and extending along the length of the trough. The cover has end flanges 42 which extend towards the base of the trough adjacent the outer sides of the sidewalls. These flanges 42 are provided with inwardly-extending projections 43 which snap into place behind the upper region of the loop portions 20 when the cover is applied to the trough. As may be seen in FIG. 4, the flanges 42 of the cover terminate along a line which is located above the region wherein the loops 20 are spaced apart less than the diameter of the circuit wires. Thus, the loops themselves restrain the wires from being moved into contact with the edges of the flange 42.

While, in FIGS. 2–4, I have shown the base of my wiring trough constructed of a single sheet metal strip, it can equally well be of a wire or similar segmental construction. For example, referring to FIG. 5 the base is shown comprising two space-apart, longitudinally-extending frame wires 45 which are suitably welded to the transversely-extending wires 33. In accordance with my invention, the longitudinally-extending frame wires 45 are located at the extreme lateral edges of the trough, and the arms 19, 20 terminate in edges 47 located beneath the upper surfaces of these frame wires, so as to prevent these terminal edges of the arms from contacting the insulation of those circuit wires extending between adjacent arms. Segments of some other suitable structural form can, of course, be substituted for either of the frame wires 45.

Forming opposed arms 19, 20 from a U-shaped wire is especially advantageous in those modifications wherein the base is constructed of segments, such as the frame wires 45 of FIG. 5, because in such modifications the bight of the U-shaped wire is capable of serving as an integral part of the base of the wiring trough.

In some applications it is most desirable that particular circuit wires be brought through the grille and maintained in locations spaced a predetermined distance from the base of the grille. A grille constructed in accordance with my invention can effectively fulfill this requirement by having its arms formed of a plurality of loops spaced at different distances from the base. Such a grille is shown in FIG. 6 wherein the grille is provided with arms spaced-apart along the length of a base 15 and secured thereto in the same manner as described with regard to FIG. 1. Each of the arms of this grille comprises a plurality of enlarged loop portions 20 which are located at different distances from the base 15. These enlarged loop portions are interconnected by a plurality of closely-adjacent, substantially parallel segments 19 corresponding to those shown in FIG. 1. The loops of adjacent arms are disposed in alignment along the length of the trough so as to provide between the pairs of adjacent arms a plurality of separate spaces 22 for receiving circuit wires leading from a bundle (not shown) extending along the length of the grille. Any selected circuit wire can be forced from the edge of the grille between any required number of loop portions and thus located in a selected space, as is desired.

Another advantage of the multiple loop type of construction shown in FIG. 6 is that the loops of any particular arm can be utilized to receive fastening means for fuses, resistors, or related devices which it might be desired to mount adjacent the grille.

It will be apparent to those skilled in the art that the wiring trough of FIGS. 2–4, as well as the grille of FIG. 1, can have each of its arms formed of the multiple loop type of construction shown in FIG. 6.

Although, in the various illustrated modifications, I have shown the loop portions 20 to be generally of a circular or an elliptical shape, it is to be understood that other shapes of loops can also be used. For example, the loops can be of a diamond-shaped or of a flattened configuration. Accordingly, the term "loop portion," as used in the appended claims, is intended to cover loops of shapes other than those shown. FIG. 7 shows still another type of grille which utilizes my invention. This grille of FIG. 7 is similar to that of FIG. 1 except that the base which supports the grillwork is of a somewhat different form and the grillwork is joined to this base in a somewhat different manner. More particularly, the base in FIG. 7 comprises an L-shaped segment 50 having a first flange 51 suitably secured, as by welding, to a supporting panel 49 or the like and a second flange 52 extending perpendicularly to the first flange. Separate arms 17 each having the same general shape as the arms 17 of FIG. 1 are secured to the second flange 52. Preferably, adjacent arms 17 are secured to alternate sides of the flange 52, as shown in FIG. 7, and the spacing between the adjacent arms corresponds to that described for the other modifications. These arms 17 of FIG. 7 are considered to be in "approximately the same plane," as such term is used in the appended claims.

A bundle 11 of circuit wires 12 is adapted to extend alongside the grillwork of FIG. 7 preferably at the right hand side thereof. A suitable cover 55 constructed similar to that shown in FIG. 3 encloses the bundle. As in FIGS. 3 and 4, the cover has a flange 42 extending toward the base and terminating along a line which is located above the region wherein the loops of adjacent arms are spaced apart less than the diameter of the circuit wires. A projection 43 snaps behind the upper region of the loop portion to retain the cover in place. An additional flange 56 extending parallel to the flange 42 and of about the same length as flange 42 aids in retaining the cover 55 in place.

While I have shown and described particular embodiments of my invention, it will be apparent to those skilled in the art that various changes and modifications can be made without departing from my invention, and I therefore intend in the appended claims to cover all such changes as fall within the true spirit and scope of my invention.

What I claim as new and desire to secure by Letters Patent of the United States is:

1. Apparatus for supporting a bundle of circuit wires and for distributing the individual wires of the bundle, comprising a longitudinally-extending supporting base along which said bundle is adapted to extend, grillwork extending alongside said base and projecting therefrom in generally perpendicular relationship, said grillwork comprising longitudinally-spaced arms formed of wire, each of said arms comprising a plurality of enlarged loop portions and closely-adjacent segments interconnecting said loop portions, the loop portions of adjacent arms being located in approximately the same plane and being disposed in alignment along the length of said trough to provide between each pair of adjacent arms a plurality of separate spaces for receiving circuit wires.

2. In combination, a bundle of circuit wires, apparatus for supporting said bundle of circuit wires and for distributing the individual wires of the bundle, said apparatus comprising a longitudinally-extending supporting base along which said bundle extends, grillwork extending alongside said base and projecting therefrom in generally perpendicular relationship, said grillwork comprising longitudinally-spaced arms formed of wire, each of said arms comprising a plurality of enlarged loop portions and closely-adjacent, substantially parallel segments interconnecting said loop portions, adjacent segments of adjacent arms being substantially parallel, the loop portions of adjacent arms being located in approximately the same plane and being disposed in alignment along the length of said trough to provide between each pair of adjacent arms a plurality of separate spaces for receiving circuit wires, the distance between adjacent loop portions being less than the diameter of the circuit wires, and said segments being resilient to permit said circuit wires to be forced between said loop portions and retained in a selected space between the segments of adjacent arms.

3. In combination, a bundle of circuit wires, apparatus for supporting said bundle of circuit wires and for distributing the individual wires of the bundle, said apparatus comprising: a longitudinally-extending supporting base along which said bundle extends, grillwork extending alongside said base and projecting therefrom in generally perpendicular relationship, said grillwork comprising longitudinally-spaced arms formed of wire having a curvilinear periphery, each arm comprising a pair of adjacent segments and an enlarged loop portion interconnecting said segments at their outer ends, the segments of adjacent arms defining therebetween a space for receiving circuit wires from said bundle which are slipped between adjacent loop portions, said space being of such a size that said circuit wires can be freely moved in a direction normal to said base, the distance between said adjacent loop portions being less than the diameter of the circuit wires, said segments being resilient to permit said circuit wires to be forced between said loop portions and retained in the space between the segments of adjacent arms, a cover for said apparatus having a flange at a side of said grillwork extending toward said base generally perpendicular to said base, means for retaining said cover in place on said apparatus, said flange terminating in an edge extending along a line which is more remote from said base than a region wherein adjacent loop portions are spaced apart less than the diameter of the circuit wires whereby said loop portions restrain the circuit wires from contacting said edge.

4. In combination, a group of circuit wires, a wiring trough for supporting said group of circuit wires and for distributing the individual wires of the group, said trough comprising a base extending longitudinally of the trough and longitudinally of said group of wires, grillwork defining spaced-apart side walls for said trough and comprising a plurality of longitudinally spaced arms formed of wire, each of said arms comprising a pair of closely-adjacent substantially parallel segments and an enlarged looped portion interconnecting said segments at their outer ends, the adjacent segments of adjacent arms being substantially parallel and defining therebetween a space for receiving circuit wires from said group which are slipped between adjacent loop portions, the loop portions of adjacent arms being located in approximately the same plane with the distance between said loop portions being less than the diameter of the circuit wires of the bundle, said segments being resilient to permit said circuit wires to be forced between said loop portions and retained in the space between the segments of adjacent wires, and a cover for the trough having flanges extending toward said base at the outer side of the side walls of the trough, said flanges having inwardly extending projections which snap behind the wire forming the loop portions to retain the cover in place on the trough, said flanges terminating along a line which is more remote from said base than a region wherein adjacent loops are spaced apart less than the diameter of the circuit wires.

5. A wall for supporting and orienting wires comprising a side wall having longitudinally spaced substantially parallel slits open at one edge of said wall and defining substantially parallel edges on longitudinally spaced fingers, the free ends of said fingers being enlarged to narrow the outer ends of the slits and provide restricted passages for the wires between the finger ends and thereby prevent accidental removal of the wires from between the fingers, said fingers being flexible to permit their deflection and provide wider finger spacing at their free ends to facilitate positioning and removal of wires between said fingers.

References Cited in the file of this patent

UNITED STATES PATENTS

| | | |
|---|---|---|
| 1,764,629 | Houts et al. | June 17, 1930 |
| 1,764,630 | Houts | June 17, 1930 |
| 2,082,099 | Cruser | June 1, 1937 |
| 2,137,536 | McConnell | Nov. 22, 1938 |
| 2,284,163 | O'Brien | May 26, 1942 |
| 2,397,291 | Robertson | Mar. 26, 1946 |
| 2,434,918 | Gall | Jan. 27, 1948 |
| 2,531,110 | Cisler | Nov. 21, 1950 |
| 2,740,001 | Vergilio | Mar. 27, 1956 |